United States Patent Office 3,035,920
Patented May 22, 1962

3,035,920
FEED PELLETING PROCESS AND THE RESULTING PRODUCT
Cloy B. Knodt, Wayzata, Minn., assignor to Cargill, Inc., a corporation of Delaware
No Drawing. Filed Sept. 3, 1959, Ser. No. 837,764
9 Claims. (Cl. 99—8)

This invention relates to a new and improved process for the pelleting of feed for animal consumption. More particularly, this invention relates to a pelleting process for animal feeds utilizing, as a binder, waste liquors derived from the digestion of plant products, such as wood; citrus pulp; straw from flax, cereal grains and the like; bagasse (cane pulp); sorghum; corn; etc.; as best exemplified by alkaline earth base spent sulfite wood liquors.

In recent years, much study and research have been directed to the combining of various types of feed ingredients into pellets and like artificially agglomerated feed forms so as to produce feedstuffs of maximal palatability, to provide greater feed efficiency, to decrease density and to make possible easier handling in bulk. For the most part, when binders have been incorporated into such artifically agglomerated feeds, they have been inorganic materials, such as diatoms, sodium bentonite, etc. Although these materials have been effective to some extent, difficulties have often been encountered in the production of pellets, and other artificially agglomerated physical forms, of adequate hardness and strength to withstand processing and handling without breaking and becoming pulverized and producing wasteful fines and dusts. Such problems are often encountered with particular desired combinations of feed ingredients used in manufacturing feeds for particular animals or particular purposes. It has been discovered that feed pellets of improved hardness and strength may be made by incorporating a small amount of calcium base spent sulfite wood liquors, in either dry or liquid form, in the pelleting feed mixture.

For convenience in this application, the expressions "pellets," "pelleting" and "pelletizing" are used in their broadest sense to include all artificially agglomerated feeds produced from finely divided feed ingredients and the processes of making the same, regardless of the particular size, shape and physical form of the agglomerated product. Thus, "pellets" include agglomerated masses of feed ingredients produced in the form of cubes, cylinders, triangular forms and the like by forcing finely divided feed ingredients through die openings and cutting off into segments of convenient length for handling and feeding; spherical masses produced by prilling or balling; granules; crumbles; and the like.

Calcium base spent sulfite wood liquors are a waste product from the conventional sulfite pulping or digestion process used in the papermaking industries. The digestion step of a typical sulfite papermaking process is carried out by boiling wood chips or the like at a temperature of from about 125° to 150° C. under pressure of about 50 to 100 lbs. per square inch in a solution of calcium bisulfite —$Ca(HSO_3)_2$— and sulfurous acid —$H_2SO_3$—, made, for example, by passing a current of sulfur dioxide through milk of lime or subjecting wetted limestone to the action of sulfur dioxide. The digestion process renders the non-cellulosic parts of the wood soluble. The waste liquors contain lignins, hemi-celluloses and sugars.

For the most part, sulfite liquors are a waste material the disposal of which creates problems of contamination and pollution of streams and the like although some limited industrial utilization is made of them. Being a product of a digestion process involving natural materials of varying composition, the precise composition of all calcium base spent sulfite wood liquors cannot be fixed since its constitution varies depending upon the nature and species of wood or other cellulosic material undergoing digestion, the conditions of the digestion treatment, and the like. The present invention is not dependent upon the use of calcium base spent sulfite wood liquors produced by any particular digestion process or based upon any particular cellulosic material.

The following typical analysis of a calcium base spent sulfite wood liquor is represented as illustrative of the composition of the binder material utilized in the practice of this invention, but without constituting a limitation upon the invention.

| | |
|---|---|
| Specific gravity at 25°C | 1.2764. |
| pH (as is) | 3.9. |
| pH (30 g./l.) | 4.4. |
| Total solids | 51.0%. |
| Total sulfur | 6.02% S (B.D.). |
| Loosely combined $SO_2$ | 0.39% S (B.D.). |
| $SO_2$ | 0.25% S (B.D.). |
| $SO_4$ | 0.02% S (B.D.). |
| CaO | 5.68% B.D. |
| MgO | 0.37% B.D. |
| $Fe_2O_3$ | 0.70% B.D. |
| $Na_2O$ | |
| $OCH_3$ | 8.55% B.D. |
| Reducing sugars as mannose | 19.9% B.D. |
| Ignited ash | 10.5% B.D. |
| Sulfate ash | 15.4% B.D. |
| Lignin (as sulfonate) | 25–32.5%. |

The sulfite liquors may be utilized in either liquid or dried form. A typical analysis of the dried calcium base spent sulfite wood liquor is as follows:

| | |
|---|---|
| Moisture | 5.0%. |
| pH (30 g./l.) | 4.4. |
| Total sulfur | 6.02% S (B.D.). |
| Loosely combined $SO_2$ | 0.39% S (B.D.). |
| $SO_2$ | 0.25% S (B.D.). |
| $SO_4$ | 0.02% S (B.D.). |
| CaO | 5.68% B.D. |
| MgO | 0.37% B.D. |
| $Fe_2O_3$ | 0.70% B.D. |
| $Na_2O$ | |
| $OCH_3$ | 8.55% B.D. |
| Reducing sugars as mannose | 19.9% B.D. |
| Ignited ash | 10.5% B.D. |
| Sulfate ash | 15.4% B.D. |

Depending upon their source, the sulfite liquors contain sugars and hemi-celluloses, such as pentosans, mannans, galactans, hexosans and the like, which upon hydrolysis produce the corresponding sugars. Magnesium base spent sulfite wood liquors may be substituted in whole or in part for calcium base liquors. Derivatives and fractions of sulfite liquors may also be used.

The feed ingredients are mixed in conventional feed mixers. The various feed ingredients, along with the sulfite liquor binding material, in either liquid or dried form, are intimately and uniformly intermingled and admixed. The feed ingredients, in most instances, are finely divided and in the form of a dry powdery mash. When admixed in dry form, the calcium base spent sulfite wood liquor is in the form of a fine dry powder. The binder is added to the feed mixture in amounts ranging from about ¼ to about 10% of the total feed weight on a dry weight (5% moisture) basis. Preferably, however, the waste sulfite liquor binder is incorporated into the feed mix in amounts ranging from about ¼ to about 5% on a dry weight basis. When the binder is incorporated in liquid form, approximately twice as much binder is employed to equal the equivalent binding power of dried sulfite liquor.

The admixed feed and binder are subjected to steam just prior to pelleting. This adds approximately 1 to 10% moisture to the mixture to raise the total moisture content to from about 10 to about 20% and raises the temperature to between about 50° and 150° F. The feed mix is then subjected to pelleting. One exemplary form of pelleting apparatus includes a die plate having a plurality of openings of desired shape tapered from wider at the top to narrower at an intermediate point and then having straight side walls to the bottom. The die openings may be round, square, triangular, hexagonal or other desired shape. They usually range in width from about 3/16 to 3/4 inch but may be either larger or smaller. The feed mix is applied to the top surface of the die plate and forced under pressure of rotating rollers into and through the die openings, being compressed and compacted in the course of its passage and then cut off into segments of desired length by a knife moving against the bottom surface of the die plate. Alternatively, pelleting may be accomplished by other extruding machines, balling drums, granulators, and the like.

After pelleting the feed is cooled, usually by blowing air through the pellets as they pass on a foraminous conveyor. In cooling the pellets lose moisture and become hard and dry. The use of the calcium base spent sulfite wood liquor binder according to the present invention produces pellets having good "green" strength which withstand handling during processing without breaking, deforming, sticking and agglomeration of a plurality of pellets and with minimum production of fines, dusts, etc.

The calcium base spent sulfite wood liquors in both liquid and dried form are useful as binding materials in pelleting a great variety of feed ingredients normally and conventionally used in the feeding of livestock, pets and other animals. Among the feed ingredients normally used in producing pelleted feed may be mentioned soybean mill feed, ground barley, ground corn, ground oats, oat mill feed, corncob flour, grain screenings, oilseed screenings meal, beet pulp, wheat bran, wheat middlings, wheat shorts, 17% protein dehydrated alfalfa, 13% protein suncured alfalfa, alfalfa stem meal, cane molasses, various fats and oils, corn gluten meal, cottonseed meal, linseed meal, soybean meal, corn distillers solubles, dried fish solubles, blood meal, fish meal, meat scraps, tankage, dried whey, locust bean meal, rice bran, bone scraps, bone meal, corn gluten feed, beet molasses, corn molasses, irradiated yeast, Vitamin A, Vitamin E, Vitamin $B_{12}$, riboflavin, niacin, sodium chloride, sodium propionate, sodium bicarbonate, sodium sulfate, cobalt sulfate, manganese sulfate, copper sulfate, epsom salts, red iron oxide, zinc oxide, limestone, dicalcium phosphate, sulfur, urea, thithiadol, sulfaquinoxaline, piperazine phosphate, phenothiazine, choline chloride, methionine hydroxy analogue, arsanilic acid, diethylstilbestrol, potassium iodide, potassium iodate, butylated hydroxy toluene, 3-nitro-4-hydroxyphenylarsonic acid, procaine penicillin, aureomycin, terramycin, anise oil, anise powder, artificial and natural flavors and colors and other like nutritive and supplemental feed ingredients.

A typical calcium base spent sulfite wood liquor derived from the sulfite process in the production of pulp from woods esesntially of the hardwood species is commercially available from Marathon Division of American Can Company in dried form under the trademark "Norlig-A" and in liquid form under the trademark "Norlig-L."

The invention is illustrated by the following examples:

*Example 1*

A pelleted pig starter was produced as follows:

A mixture was made up of 40 lbs. of dried (5% moisture) calcium base spent sulfite wood liquor, 490 lbs. ground yellow corn, 600 lbs. feeding oatmeal, 200 lbs. cane sugar, 300 lbs. dried skim milk, 200 lbs. of 50% protein soybean oil meal, 40 lbs. of fish meal, 50 lbs. of distillers dried corn solubles, 30 lbs. of dicalcium phosphate, 20 lbs. ground limestone, 10 lbs. of iodized salt and 20 lbs. of a mixture containing 8,000,000 I.U. Vitamin A, 24 grams of niacin, 6 grams of riboflavin, 6 grams of calcium pantothenate, 100 grams of choline chloride, 20 milligrams of Vitamin $B_{12}$, 800,000 I.U. Vitamin $D_2$ and enough zinc to add 100 parts per million. These ingredients were intimately and uniformly admixed and continuously fed into the mixing chamber of a 50 H.P. California flatbed pellet mill. There the mixture was heated to about 115° F. and moistened to a total moisture content of about 15% by the introduction of steam which condensed as it was blown into the mixture of the ingredients in the mixing chamber of the pellet mill. The heated and moistened feed ingredient mixture was fed from the mixing chamber onto the die of the pellet mill at a rate of about three tons per hour. The mixture was then forced through the 3/16 inch holes in the die and cut into 3/8 inch lengths.

In substantially the same manner diets have been prepared for pigs, cattle, horses, rabbits, dogs, turkeys, broilers, chicks, poults, pullets, laying hens and other livestock.

*Example 2*

A pelleted cattle diet formula has been prepared as follows:

A mixture is made up of 40 lbs. of dried calcium base spent sulfite wood liquor, 1860 lbs. of ground yellow corn, 20 lbs. of dicalcium phosphate, 10 lbs. of ground limestone, 20 lbs. of iodized salt, 50 lbs. of 44% protein soybean oil meal. These ingredients are admixed, moistened with steam and forced through a pelleting die, cut into lengths and blown with air while carried on a screen to harden and dry the pellets.

*Example 3*

A pelleted laying hen diet has been prepared by admixing 40 lbs. of dried calcium base spent sulfite wood liquor, 1069.6 lbs. of ground yellow corn, 300 lbs. of wheat middlings, 280 lbs. of 50% protein soybean oil meal, 40 lbs. of 50% protein meat and bone scraps, 40 lbs. of fish meal, 60 lbs. of 17% protein dehydrated alfalfa meal, 20 lbs. of dried whey, 40 lbs. of dicalcium phosphate, 80 lbs. of ground limestone, 10 lbs. of salt, 0.4 lb. of manganese sulfate and 20 lbs. of a mixture to contain 2,200,000 I.U. of Vitamin A, 4 grams of niacin, 2 grams of riboflavin, 4 grams of calcium pantothenate, 2 milligrams of Vitamin $B_{12}$, 3,000,000 I.C.U. of Vitamin $D_3$, 0.5 gram of procaine penicillin and 7.5 grams of zinc bacitracin. This mixture was moistened with steam, pelleted, dried and hardened as described.

The feed pelletizing process of this invention utilizing spent sulfite liquors is applicable to the preparation of feed for livestock, pets, domestic fur-bearing animals, fish and the like. This includes pelleted feed for cattle, swine, poultry, dogs, cats, rabbits, mink, chinchilla, canaries, parakeets, fish and the like.

It has been found that the addition of 2% calcium base spent sulfite wood liquor to a swine feed improved pellet hardness from 4.5 kilograms to 7.2 kilograms (as measured by a Stokes pellet hardness tester) in the production of 3/16 inch pellets. A second method of testing involved the mixing of two batches, each of 400 lbs. of pellets, one batch containing the sulfite liquor binder and the other omitting it. These batches were mixed in turn in a one-ton capacity ribbon-type horizontal mixer for 12 minutes. The pellets containing addition of 2% (dry weight basis) calcium base spent sulfite wood liquors developed only 18 lbs. of fines (as determined with a 16 mesh wire screen) whereas pellets containing no sulfite liquor additive developed 47.8 lbs. of fines.

Under plant conditions the pelleting of feeds containing 2% added calcium base spent sulfite wood liquors on a dry weight basis reduced the percentage of fines from 7.34% (mean of 30 truckloads) to 2.73% (mean of 24 truckloads) as delivered to bulk trucks at the plant. Fines, in this instance, are that portion passing through a 1/16 inch screen.

It will be seen that the addition of calcium base spent sulfite wood liquors to feed ingredients results in improved binding exemplified by increase in hardness with consequent reduction in breaking and crumbling of pellets and reduction in the production of fines.

It is apparent that many modifications and variations of this invention as hereinbefore set forth may be made without departing from the spirit and scope thereof. The specific embodiments described are given by way of example only and the invention is limited only by the terms of the appended claims.

I claim:
1. The method of artificially agglomerating feedstuffs which comprises intimately admixing finely divided feed ingredients with a small but effective amount of at least about 1/4% on a dry weight basis, as a binding material, of a substance selected from the class consisting of alkaline earth base spent sulfite wood liquors and fractions and derivatives thereof, and shaping the feed ingredients and binder mixture into agglomerated particles of desired size and shape.

2. The method according to claim 1 further characterized in that said feed ingredients are shaped by being forced under pressure through a confined opening and thereafter severed into discrete pellets.

3. The method of artificially agglomerating feedstuffs which comprises intimately admixing finely divided feed ingredients with a small but effective amount of at least about 1/4% dry weight basis of calcium base spent sulfite wood liquor as a binding material and shaping the feed ingredients and binder mixture into agglomerated particles of desired size and shape.

4. A method according to claim 3 further characterized in that steam is introduced to said feed ingredients and binder mixture prior to shaping to introduce from about 1 to 10% added moisture to said mixture.

5. A method according to claim 3 further characterized in that said calcium base spent sulfite wood liquor is included in the proportion of from about 1/4 to about 10% on a dry weight basis.

6. A method according to claim 5 further characterized in that said calcium base spent sulfite wood liquor is incorporated in amounts ranging from about 1/4 to about 5% on a dry weight basis.

7. A method according to claim 3 further characterized in that said feed ingredients are agglomerated by forcing the feed ingredients and binder mixture under pressure through a confined opening and thereafter severing into discrete pellets.

8. A method of pelleting feedstuffs which comprises intimately and uniformly admixing finely divided feed ingredients with from about 1/4 to about 10% on a dry weight basis of a calcium base spent sulfite wood liquor, introducing steam into said feed ingredient and sulfite wood liquor mixture to raise the temperature of the mixture to between about 50° and about 150° F. and raise the moisture content of the mixture by from about 1 to about 10%, shaping said mixture by forcing it under pressure through confined openings and severing into lengths to produce discrete pellets, and thereafter blowing with air to cool, dry and harden the pellets.

9. As a new article of manufacture, a strong hard dry feed pellet made according to the method of claim 1.

References Cited in the file of this patent

UNITED STATES PATENTS

| 1,184,228 | Carter | May 23, 1916 |
| 2,418,311 | McFarlane et al. | Apr. 1, 1947 |
| 2,905,558 | Adams | Sept. 22, 1959 |

FOREIGN PATENTS

| 7,495 | Great Britain | 1885 |

OTHER REFERENCES

"The Handbook of Feedstuffs," by Seiden, 1957, Springer Publishing Company, Inc., New York, pages 158, 159, 300, 301, 350 and 566.